US012221908B2

(12) United States Patent
Urushibara et al.

(10) Patent No.: US 12,221,908 B2
(45) Date of Patent: Feb. 11, 2025

(54) SOUND REDUCING DEVICE FOR INTERNAL COMBUSTION ENGINE

(71) Applicant: HONDA MOTOR CO., LTD., Tokyo (JP)

(72) Inventors: Yuta Urushibara, Tokyo (JP); Hiroshi Sakai, Tokyo (JP); Tetsuya Hiraide, Tokyo (JP); Tomohiko Nozaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/507,895

(22) Filed: Nov. 13, 2023

(65) Prior Publication Data

US 2024/0167398 A1 May 23, 2024

(30) Foreign Application Priority Data

Nov. 17, 2022 (JP) ................................ 2022-184344

(51) Int. Cl.

| | |
|---|---|
| ***F01L 1/02*** | (2006.01) |
| ***F02B 75/22*** | (2006.01) |
| ***F02F 7/00*** | (2006.01) |
| *F01L 1/053* | (2006.01) |

(52) U.S. Cl.

CPC .............. *F01L 1/024* (2013.01); *F02B 75/22* (2013.01); *F02F 7/008* (2013.01); *F01L 2001/0537* (2013.01)

(58) Field of Classification Search

CPC ... F01L 1/024; F01L 2001/0537; F02B 75/22; F02B 67/00; F02B 77/11; F02F 7/008

USPC ....................................................... 123/90.17

See application file for complete search history.

(56) References Cited

U.S. PATENT DOCUMENTS

| | | | | | |
|---|---|---|---|---|---|
| 5,397,274 | A * | 3/1995 | Gesenhues | F02B 67/06 474/146 |
| 2003/0010318 | A1 * | 1/2003 | Kuroda | F01L 13/0005 123/90.4 |

FOREIGN PATENT DOCUMENTS

| | | | | | |
|---|---|---|---|---|---|
| GB | 2512449 | A * | 10/2014 | F02B 77/13 |
| GB | 2512499 | A | 10/2014 | |
| JP | S62101041 | U | 6/1987 | |
| JP | H05306632 | A | 11/1993 | |
| JP | H06213072 | A | 8/1994 | |
| JP | 2000008950 | A | 1/2000 | |

OTHER PUBLICATIONS

Notice of Reasons for Refusal for Japanese Patent Application No. 2022-184344 dated Jan. 23, 2024; 7 pp.

* cited by examiner

*Primary Examiner* — Kenneth J Hansen
*Assistant Examiner* — Kelsey L Stanek
(74) *Attorney, Agent, or Firm* — Armstrong Teasdale LLP

(57) ABSTRACT

A sound reducing device (30) for an internal combustion engine (1, 101) comprises a chamber forming member (33) defining a sound reducing chamber (32) having a prescribed column length jointly with a belt cover, and the sound reducing chamber communicates with the belt chamber via an opening (31), and the opening opposes a part of a timing belt passed around the cam pulley.

10 Claims, 6 Drawing Sheets

SOUND REDUCING DEVICE FOR INTERNAL COMBUSTION ENGINE

TECHNICAL FIELD

The present invention relates to a sound reducing device for an internal combustion engine, and in particular to a sound reducing device for an internal combustion engine including a sound reducing chamber defined jointly by a belt cover and a chamber forming member.

BACKGROUND ART

In recent years, as a part of efforts to ensure access to affordable, reliable, sustainable and advanced energy for more people, research and development efforts have been placed on weight reduction with an aim to improve energy efficiency.

In internal combustion engines, typically, a timing belt is employed to transmit the rotation of the crankshaft to the camshaft. In such internal combustion engines, the noise generated by the timing belt during the operation of the internal combustion engine creates a major problem. As a technology for reducing this noise, JPS62-101041U discloses a timing belt cover that is formed with a resonator chamber on the inside or outside of the belt cover, and having a prescribed volume. The resonator chamber is formed as a Helmholtz resonator, and communicates with a belt chamber defined by the timing belt cover. The resonator chamber is positioned in a vertically middle part of the belt cover.

JPH05-306632A discloses a timing belt cover having a space reducing means for reducing the space in the belt chamber with the aim of reducing the noise caused by the timing belt. The space reducing means is incorporated with a Helmholtz resonator that communicates with the belt chamber and reduces the resonant vibration of the air in the belt chamber. The resonator chamber is again positioned in a vertically middle part of the belt cover.

However, according to the prior art, no thought is given to the positioning of the resonator chamber or the dimensions thereof, in particular to the communication port of the resonator chamber in spite of the fact that the positioning of the communication port and the size of the resonator chamber have a significant influence on the performance of the resonator chamber.

In view of such a problem of the prior art, a primary object of the present invention is to provide a sound reducing device for an internal combustion engine that can effectively reduce noises due to the vibration of the timing belt while minimizing the increase in the weight of the internal combustion engine.

To achieve such an object, the present invention provides a sound reducing device (30) for an internal combustion engine (1, 101) that includes a crankshaft (3) rotatably supported by an engine main body (2), a camshaft (15) rotatably supported by the engine main body, a timing belt (18) passed around a crank pulley (16) fitted to the crankshaft and a cam pulley (17) fitted to the camshaft, and a belt cover (10) attached to the engine main body to define a belt chamber (14) for accommodating the timing belt therein jointly with the engine main body, the sound reducing device comprising a chamber forming member (33) defining a sound reducing chamber (32) having a prescribed column length jointly with the belt cover, wherein the sound reducing chamber communicates with the belt chamber via an opening (31), and the opening opposes a part of the timing belt passed around the cam pulley.

According to this aspect, since the sound reducing chamber is formed in an upper part of the belt cover, the presence of the sound reducing chamber is less likely to interfere with the positioning of the internal combustion engine in a limited space of a vehicle or the like. Further, since the sound reducing chamber is formed jointly by the belt cover and the chamber forming member, an increase in the weight of the belt cover including the sound reducing device is minimized.

Preferably, the sound reducing chamber (32) overlaps with the cam pulley (17) as viewed in an axial direction with respect to the camshaft.

Since the chamber forming member covers the cam pulley on top of the belt cover, the noise generated from the cam pulley can be favorably shielded so that propagation of noise to the outside is further reduced.

Preferably, the camshaft is one of a pair of camshafts (15I, 15E) for intake and exhaust, respectively, each fitted with a corresponding cam pulley (17I, 17E), and the internal combustion engine further includes a tension adjusting device (23) for adjusting a tension of a slack side of the timing belt, and wherein the opening is located opposite to a part of the timing belt wrapped around the cam pulley which is located on a tight side of the timing belt.

Since the opening of the sound reducing chamber can be positioned so as to coincide with an antinode of the vibration of the air in the belt chamber which can be located in the region of the cam pulley, noises due to the vibration of the timing belt can be minimized.

Preferably, the sound reducing chamber is one of a pair of sound reducing chambers (32A, 32B) having respective openings and different column lengths corresponding to different frequency bands.

Thereby, noise can be reduced in two frequency bands so that an overall noise reducing performance can be improved.

Preferably, the sound reducing chambers are formed so as not to overlap with each other as viewed in the axial direction with respect to the camshaft.

Thereby, an increase in the axial dimension of the internal combustion engine can be minimized, and the space efficiency can be optimized.

Preferably, the opening of one of the sound reducing chambers is located opposite to a part of the timing belt passed around one of the cam pulleys, and the opening of another of the sound reducing chambers is located opposite to a part of the timing belt passed around another of the cam pulleys.

Since the openings of the two sound reducing chambers are located at positions where the noise reduction effect is maximized, the generation of noise due to the vibration of the timing belt is effectively minimized.

Preferably, one of the sound reducing chambers is located so as to overlap with one of the cam pulleys as viewed in the axial direction with respect to the camshafts, and another of the sound reducing chambers is located so as to overlap with another of the cam pulleys as viewed in the axial direction with respect to the camshafts.

Since the two sound reducing chambers cover the cam pulleys from the outside, the propagation of noise from the cam pulleys can be reduced. Since the upper part of the belt cover covering the two cam pulleys can be used entirely for forming the sound reducing chambers, space efficiency can be improved.

Preferably, the internal combustion engine (1, 101) consists of a V-type engine having a pair of cylinder heads (5), and the chamber forming member (33) is provided on the cylinder head on the tight side of the timing belt and not on the cylinder head on the slack side of the timing belt.

Thereby, the noise generated from the belt cover of the V-type engine can be favorably reduced while minimizing an increase in weight and cost as compared to the case where the two cylinder heads are both provided with sound reducing chambers.

Preferably, the belt cover and the chamber forming member are made of resin material, and are formed as an integral molded member.

Thereby, the sound reducing chamber can be easily formed. Further, since the chamber forming member is integrated with the belt cover, it is easy to assemble the belt cover and the sound reducing device to the engine main body.

The present invention thus provides a sound reducing device for an internal combustion engine that can effectively reduce noises due to the vibration of the timing belt while minimizing the increase in the weight of the internal combustion engine.

DESCRIPTION OF THE PREFERRED EMBODIMENT(S)

The present invention will be described in the following with reference to the appended drawings.

First Embodiment

Figure 1:
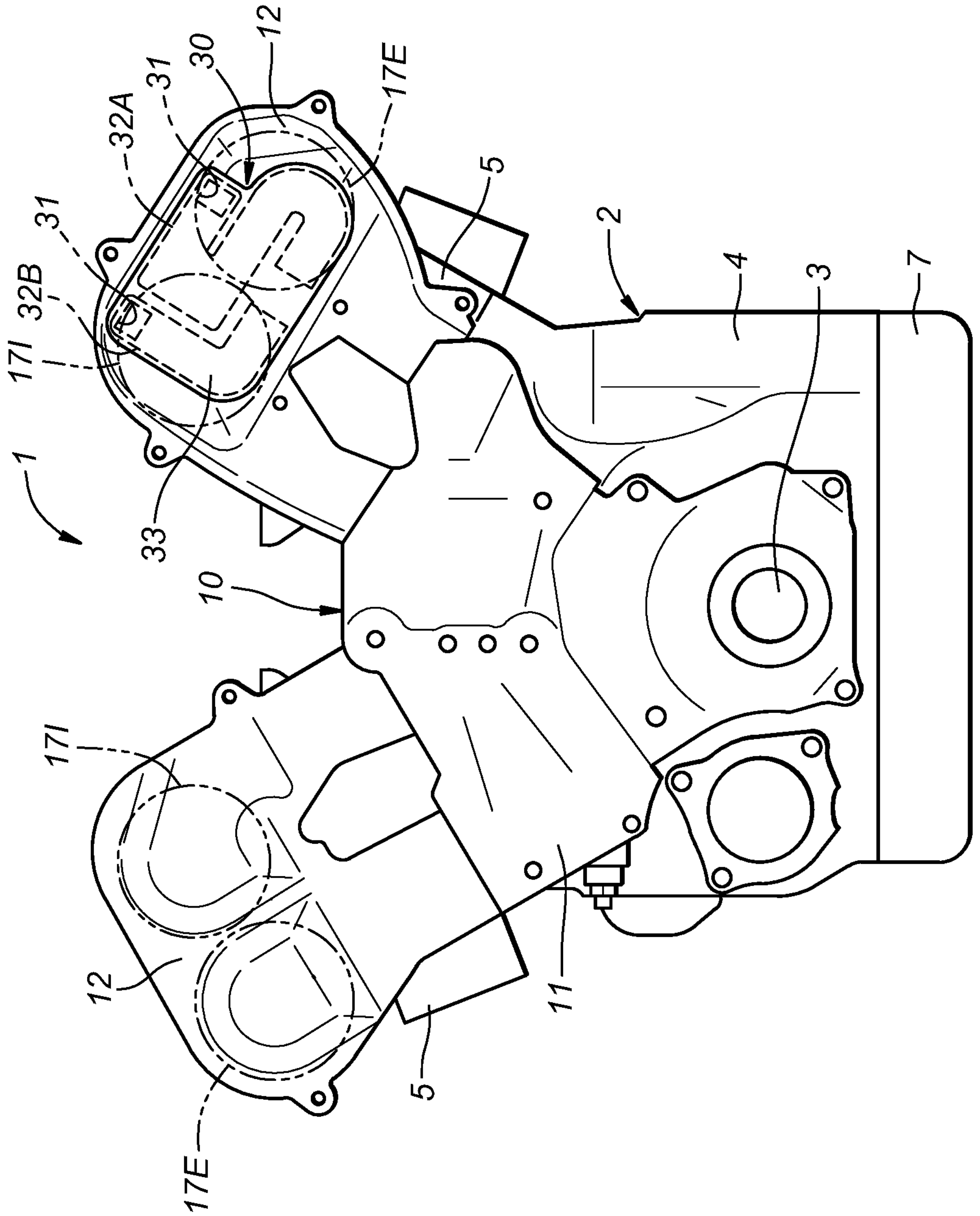
FIG. 1 is a front view of an internal combustion engine according to a first embodiment of the present invention.

A first embodiment of the present invention will be described in the following with reference to FIGS. 1 to 4. FIG. 1 is a front view of an internal combustion engine 1 fitted with a sound reducing device 30 according to the first embodiment. The internal combustion engine 1 of this embodiment is a V-type engine having two banks of cylinders arranged in a V shape, and is provided with an engine main body 2 including an engine block 4 that is V shaped and supports a crankshaft 3 extending in the fore and aft direction, and a pair of cylinder heads 5 that are fastened to the upper ends of the V-shaped engine block 4. The cylinders are jointly defined by the cylinder heads 5 and the engine block 4 in a per se known manner. Two cylinder head covers 6 (FIG. 2) are fastened to the upper parts of the cylinder heads 5. An oil pan 7 is fastened to the lower end of the engine block 4. Hereinafter, the end of the internal combustion engine 1 corresponding to an end of the crankshaft fitted with a crank pulley 16 (which will be described hereinafter) will referred to as the front end without regard to how the engine is mounted on the vehicle.

Figure 2:
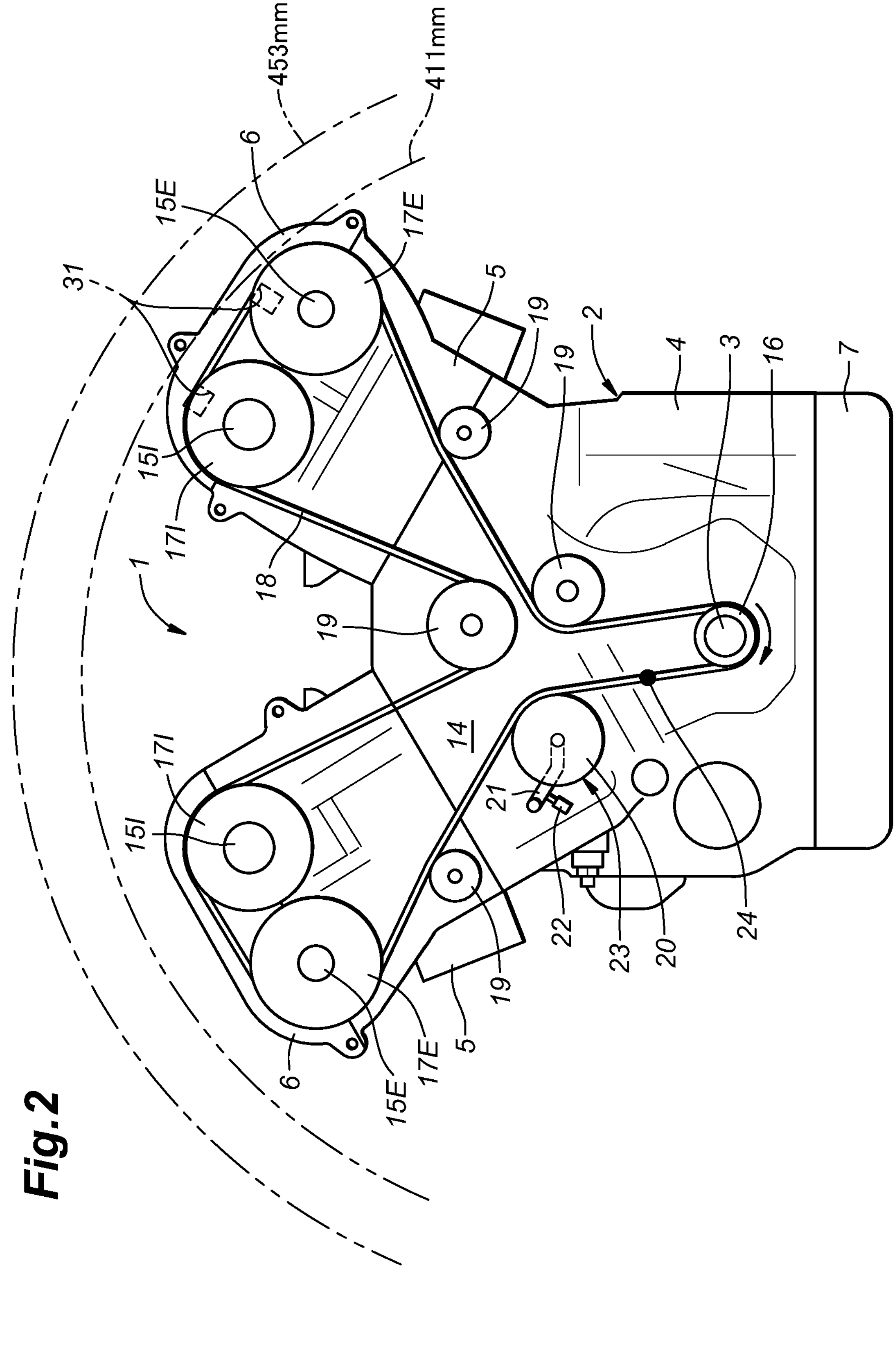
FIG. 2 is a front view of the internal combustion engine with the belt cover thereof removed.

A belt cover 10 is attached to the front end of the engine main body 2 with a plurality of bolts. FIG. 2 is a view similar to FIG. 1 with the belt cover removed. The belt cover 10 in this embodiment consists of a plurality of parts which includes a main belt cover 11 that primarily covers the engine block 4 from the front, a pair of upper belt covers 12 that primarily cover the left and right cylinder heads 5 from the front, respectively. The main belt cover 11 and the left and right upper belt covers 12 are made of resin, and may be joined to each other in advance, for example, by vibration welding or the like, or may be configured to be separately assembled to the engine main body 2. The main belt cover 11 and the left and right upper belt covers 12 form a belt chamber 14 (FIG. 2) jointly with the engine main body 2.

As shown in FIG. 2, each cylinder head 5 rotatably supports an intake camshaft 15I and an exhaust camshaft 15E. Hereinafter, the intake camshaft 15I and the exhaust camshaft 15E may be simply referred to as the camshaft 15 when collectively referred to or no distinction is required. The internal combustion engine 1 is a DOHC engine in which the camshafts 15 are positioned above the corresponding cylinders or on the corresponding cylinder head 5. The intake camshafts 15I are positioned on a laterally inner side of the respective cylinder heads 5, and the exhaust camshafts 15E are positioned on a laterally outer side of the respective cylinder heads 5.

The crankshaft 3 protrudes forward from the front surface of the engine block 4, and a crank pulley 16 is fixedly attached to the front end of the crankshaft 3 that projects from the engine block 4. During operation of the internal combustion engine 1, the crankshaft 3 and the crank pulley 16 rotate clockwise as indicated by the arrow in FIG. 2.

The intake camshaft 15I and the exhaust camshaft 15E protrude forward from the front surface of the corresponding cylinder head 5. Cam pulleys 17I and 17E are attached to the front ends of the intake camshaft 15I and the exhaust camshaft 15E projecting from the cylinder head 5, respectively. Hereinafter, the cam pulleys 17I and 17E may be simply referred to as the cam pulleys 17 when they are collectively referred to or when no distinction is required. Each cam pulley 17 has a diameter twice as large as that of the crank pulley 16. The cam pulleys 17 may be directly attached to the corresponding intake camshaft 15I and exhaust camshaft 15E, or may be each attached to the corresponding intake camshaft 15I or exhaust camshaft 15E via a variable valve timing mechanism that changes the opening/closing timing of the valves.

An endless timing belt 18 is passed around the crank pulley 16 and the four cam pulleys 17 in such a manner that the inner surface of the timing belt 18 is in contact with the outer peripheries of these pulleys. The four cam pulleys 17 therefore rotate in the same direction as the crankshaft 3 at half the rotational speed of the crankshaft 3 during operation of the internal combustion engine 1. In this embodiment, the timing belt 18 consists of a cogged belt, and the pulleys on which the timing belt 18 is passed around are configured as corresponding cogged wheels.

Four idler pulleys 19 and one tensioner pulley 20 are provided on the front surface of the engine main body 2. The timing belt 18 is passed around the idler pulleys 19 and the tensioner pulley 20 so that the outer surface of the timing belt 18 which is not cogged is in contact with these pulleys. The four idler pulleys 19 are rotatably supported by pins that are fixedly secured to the engine main body 2.

The tensioner pulley 20 is movably provided on the engine main body 2 to adjust the tension of the timing belt 18. More specifically, the tensioner pulley 20 is rotatably supported by a pin fixed to an arm 21 which is in turn pivotally supported by the engine main body 2. The arm 21 is biased by a tensioner spring 22 so that the tensioner pulley 20 rotatably supported by the arm 21 applies tension to the timing belt 18. The tensioner pulley 20, the arm 21 and the tensioner spring 22 constitute a tension adjusting device 23 for adjusting the tension of the timing belt 18.

During operation of the internal combustion engine 1, the crank pulley 16 rotates in the clockwise rotation, and this causes the timing belt 18 to travel in the clockwise direction. Since the crank pulley 16 applies the input torque to the timing belt 18 which in turns applies the torque that is required to rotate the cam pulleys 17, the part of the timing belt 18 extending on the left hand side of the crank pulley 16 in FIG. 2 may be referred to as the slack side, and the part of the timing belt 18 extending on the right hand side of the crank pulley 16 in FIG. 2 may be referred to as the tight side. A tension adjusting device 23 is positioned on the slack side (left side) of the crank pulley 16, and maintains the tension in the part of the timing belt 18 on the slack side of the crank pulley 16.

Figure 4:
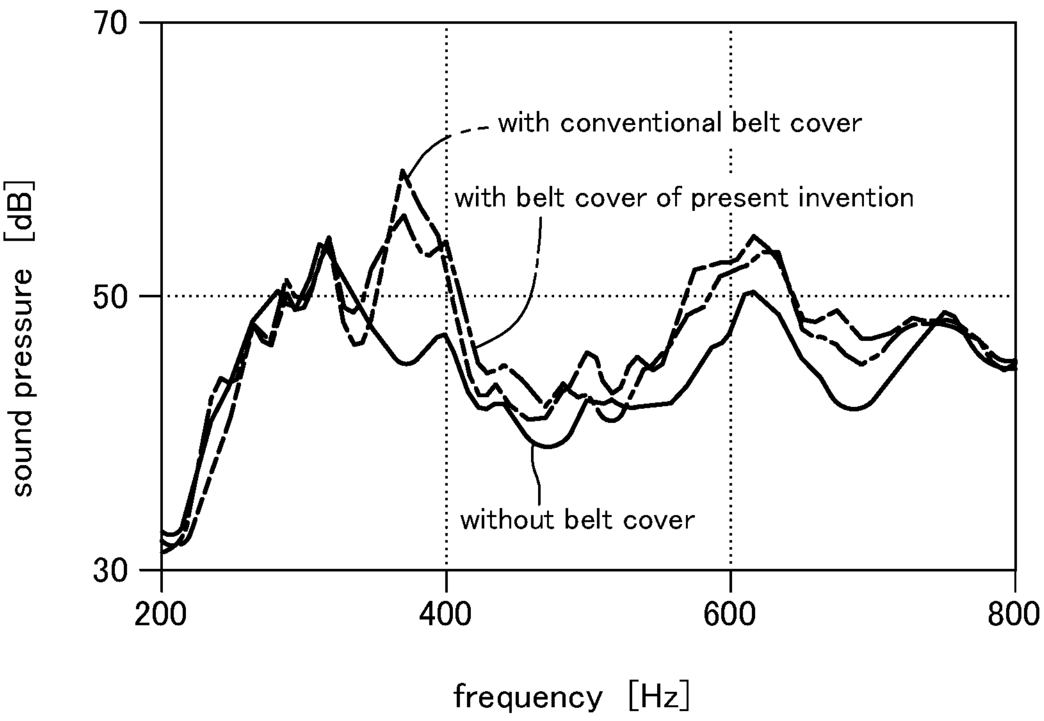
FIG. 4 is a graph showing the effect of the sounding reducing device according to the present invention.

The part of the timing belt 18 extending between the crank pulley 16 and the tension adjusting device 23 is particularly subjected to tension fluctuations, and thereby tends to oscillate (string vibration) during the operation of the internal combustion engine 1. The black dot on the timing belt 18 in FIG. 2 indicates the primary antinode point 24 (vibration source) of this string vibration. The string vibration of this part of the timing belt 18 may cause a resonance vibration of the air inside the belt chamber 14, and this may be a cause of an undesired noise of the internal combustion engine 1. In this particular internal combustion engine 1, two resonant frequencies are predominant in the vibration of the air in the belt chamber 14, FIG. 4 shows the frequency distributions of noise level. When there is no belt cover, the noise level is generally low as indicated by the solid line in FIG. 4. When the timing belt cover with no countermeasure is placed, the noise level is generally high as indicated by the broken line in FIG. 4. As shown in this graph, the increase in the noise level due to the presence of the belt cover 10 is particularly pronounced in the frequency bands of 375 Hz and 620 Hz (resonant frequencies).

The air in the belt chamber 14 may be considered as being vibrated by the antinode point 24 (vibration source) of the timing belt 18. It is known that a favorable noise reduction can be achieved by positioning of an opening of a sound reducing chamber (Helmholtz resonator) in an antinode of the vibration of the air in the belt chamber 14. However, since the sound reducing chamber occupies a certain volume, there are some restrictions on the positioning of the sound reducing chamber 32. Based on such considerations, it was noted that a primary antinode (½ wavelength) of the vibration of the air in the belt chamber 14 at the frequency of 375 Hz can be located in a region which is displaced by 453 mm from the vibration source 24, and a secondary antinode (¾ wavelength) of the vibration of the air in the belt chamber 14 at the frequency of 620 Hz can be located in a region which is displaced by 411 mm from the vibration source 24. Therefore, by providing two sound reducing chambers 32 having openings 31 at such positions, the resonant vibrations of the air in the belt chamber 14 at these frequencies can be minimized.

As indicated by the imaginary circles in FIG. 2, circles centered on the vibration source 24 and having diameters of 453 mm and 411 mm pass slightly outside of the belt cover 10. In particular, the upper end part of the belt chamber 14 for the right cylinder bank is further from the vibration source 24 than the upper end part of the belt chamber 14 for the left cylinder bank. Therefore, the upper end part of the belt chamber 14 for the right cylinder bank may be considered as a suitable part for placing an opening of a sound reducing chamber 32 effective in reducing noises in the two frequency bands mentioned above.

The inventors of the present application conducted experiments in which the opening of a sound reducing chamber 32 is placed in a number of different positions. According to these experiments, it was observed that a favorable noise reducing result can be achieved by positioning the opening 31 of a sound reducing chamber 32 at an upper end part of the belt chamber 14 on the right cylinder bank.

In these experiments, it was observed that when the opening 31 was provided between the two cam pulleys 17, or at a position opposing the part of the timing belt 18 located between the two cam pulleys 17, the noise reducing effect was comparatively low. On the other hand, when the opening 31 was positioned opposite to a part of the timing belt 18 wound around either one of the two cam pulleys 17, the noise reducing effect was comparatively high.

Based on this finding, the inventors designed the belt cover 10 to be incorporated with a pair of sound reducing chambers 32 having openings 31 opposing the parts of the timing belt 18 passed around the cam pulleys 17 of the right cylinder bank, respectively.

Depending on the configuration of the internal combustion engine, the antinode points where the opening 31 of a sound reducing chamber 32 should be placed for a desired effect may vary. However, at least in most cases, suitable antinode points may be found on and around the cam pulleys 17. Therefore, placing the opening of a sound reducing chamber on and around the cam pulleys 17 should be considered to be within the purview of the present invention.

The details of the sound reducing chambers 32 will be described in the following with reference to FIG. 3 which is a rear view of the upper belt cover 12 for the right cylinder bank.

A chamber forming member 33 made of resin material similar to the upper belt cover 12 is attached to an outer side of an upper part of the right upper belt cover 12 by ultrasonic welding, friction welding or otherwise to jointly define a pair of sound reducing chambers 32 (32A, 32B). These sound reducing chambers 32 are each provided with a rectangular opening 31 which is formed in the part of the upper belt cover 12 opposing an upper end part of the corresponding cam pulley 17 (or the part of the timing belt 18 passed around the upper end part of the corresponding cam pulley 17). The sound reducing chambers 32 are provided with prescribed column lengths which are tuned to the frequency bands that are desired to be controlled, and are separated from each other.

The sound reducing chamber 32 on the right side of FIG. 1 (hereinafter referred to as the first sound reducing chamber 32A) has a column length of 232 mm, which is ¼ of the wavelength of the target noise, in order to reduce the noise of 375 Hz. The sound reducing chamber 32 on the left side of FIG. 1 (hereinafter referred to as the second sound reducing chamber 32B) has a column length of 124 mm, which is ¼ of the wavelength of the target noise, in order to reduce noise of 620 Hz. In this disclosure, the first sound reducing chamber 32A and the second sound reducing chamber 32B are simply referred to as the sound reducing chamber 32 when they are collectively referred to, or no distinction between them is required.

The opening 31 of the first sound reducing chamber 32A is positioned so as to oppose the part of the timing belt 18 that is wound around the cam pulley 17E of the exhaust camshaft 15E, in particular the upper end part thereof. The cam pulley 17E of the exhaust camshaft 15E is positioned closer to the tension side of the timing belt 18 than the cam pulley 17I of the intake camshaft 15I. In other words, the opening 31 of the first sound reducing chamber 32A against noises of 375 Hz is provided at the farthest position from the vibration source 24. Therefore, the noise at the frequency of 375 Hz caused by the vibration of the timing belt 18 can be effectively suppressed.

As discussed above, the vibration of the timing belt 18 is large at the part thereof extending between the crank pulley 16 and the tension adjusting device 23 or at the part thereof where a significant amount of slack exists (which may be referred to as the vibration source 24). The antinodes of the vibration of the air in the belt chamber 14 are located along the length of the belt chamber 14, and the air vibration in this region is considered to be responsible for the noise that is transmitted to the exterior of the vehicle or to the cabin of the vehicle. In the present embodiment, the opening 31 of the first sound reducing chamber 32A for the primary vibration at the frequency of 375 Hz is provided at an upper end part of the belt chamber 14 on the tension side which is considered to coincide with an antinode.

The opening 31 of the second sound reducing chamber 32B is positioned so as to oppose the part of the timing belt 18 that is wound around the cam pulley 17I of the intake camshaft 15I, in particular the upper end part thereof. In other words, the opening 31 of the second sound reducing chamber 32B against noises of 620 Hz is provided at the farthest position from the vibration source 24 which is considered to coincide with an antinode. Therefore, the noise at the frequency of 620 Hz caused by the vibration of the timing belt 18 can be effectively suppressed.

In the front view shown in FIG. 1, the first sound reducing chamber 32A extends from the corresponding opening 31 leftward, downward, rightward, downward, and leftward, in the shape of letter S. The vertical expanse of the first sound reducing chamber 32A substantially coincides with the vertical expanse of the exhaust cam pulley 17E. An upper part of the first sound reducing chamber 32A slightly overlaps with the intake cam pulley 17I.

The second sound reducing chamber 32B extends from the corresponding opening 31 downward and rightward, in the shape of letter L. The vertical expanse of the second sound reducing chamber 32B substantially coincides with the vertical expanse of the intake cam pulley 17I. The lower lateral part of the second sound reducing chamber 32B extends under the part of the first sound reducing chamber 32A overlapping with the intake cam pulley 17I.

Figure 3:
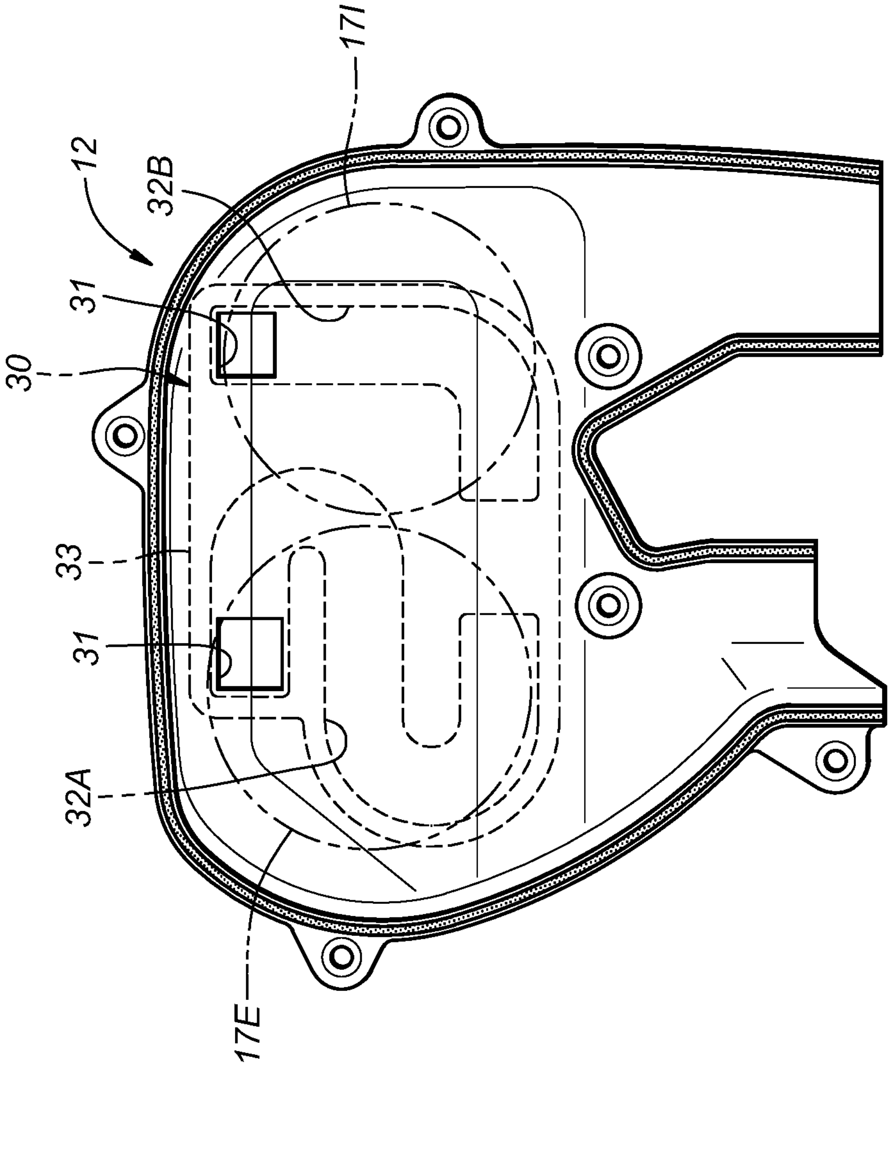
FIG. 3 is a rear view of the right belt cover.

As shown in FIG. 3, the noise pressure level of the internal combustion engine 1 provided with the belt cover 10 of the illustrated embodiment was less than that of the internal combustion engine 1 provided with a conventional belt cover in both the 375 Hz and 620 Hz frequency bands.

In the present embodiment, the chamber forming member 33 defines the two sound reducing chambers 32 (the first sound reducing chamber 32A and the second sound reducing chamber 32B) having mutually different column lengths so as to correspond to two mutually different frequency bands. As a result, the generation of noises in two frequency bands can be suppressed, and the noise levels can be reduced over a wider frequency range.

Also, as shown in FIGS. 1 and 3, the two sound reducing chambers 32 are arranged so as not to overlap each other when viewed in the axial direction with respect to the crankshaft. Therefore, the axial dimension of the sound reducing device 30 can be minimized. Therefore, an increase in the axial dimension of the internal combustion engine 1 can be avoided.

As shown in FIG. 1, the first sound reducing chamber 32A is positioned so as to face the part of the timing belt 18 that is wrapped around one of the cam pulleys 17, and the second sound reducing chamber 32B is positioned so as to face the part of the timing belt 18 that is wrapped around the other of the cam pulleys 17. Since the openings 31 of the two sound reducing chambers 32 are located remotely from the vibration source 24 and have a high noise reduction effect, noise generation due to the vibration of the timing belt 18 is effectively suppressed.

The first sound reducing chamber 32A is positioned so as to overlap one of the cam pulleys 17 in front view, and the second sound reducing chamber 32B is positioned so as to overlap the other of the cam pulleys 17 in front view. Thus, the chamber forming member 33 defining the two sound reducing chambers 32 jointly with the belt cover 10 covers the cam pulleys 17 from the outside. As a result, propagation of noises to the outside due to vibration of the timing belt 18 is suppressed.

As described above, the internal combustion engine 1 is a V-type engine in which the engine main body 2 forms a pair of cylinder banks arranged in a V shape and has two cylinder heads 5. The chamber forming member 33 is provided only for the right cylinder head 5 located on the tension side of the timing belt 18. Thus, the chamber forming member 33 is provided for the cylinder head 5 on the far side from the vibration source 24. As a result, noise generated from the belt cover 10 of the V-type engine is favorably suppressed while minimizing an increase in weight.

Second Embodiment

A second embodiment of the present invention will be described in the following with reference to FIGS. 5 and 6. The internal combustion engine 101 in the second embodiment of the present invention consists of an inline multicylinder engine having a plurality of cylinders (four cylinders, for example) arranged in a single row. The parts of this internal combustion engine of this embodiment corresponding to those of the first embodiment will be denoted with like reference numerals, and description of such parts may be omitted in the following disclosure to avoid redundancy.

Figure 5:
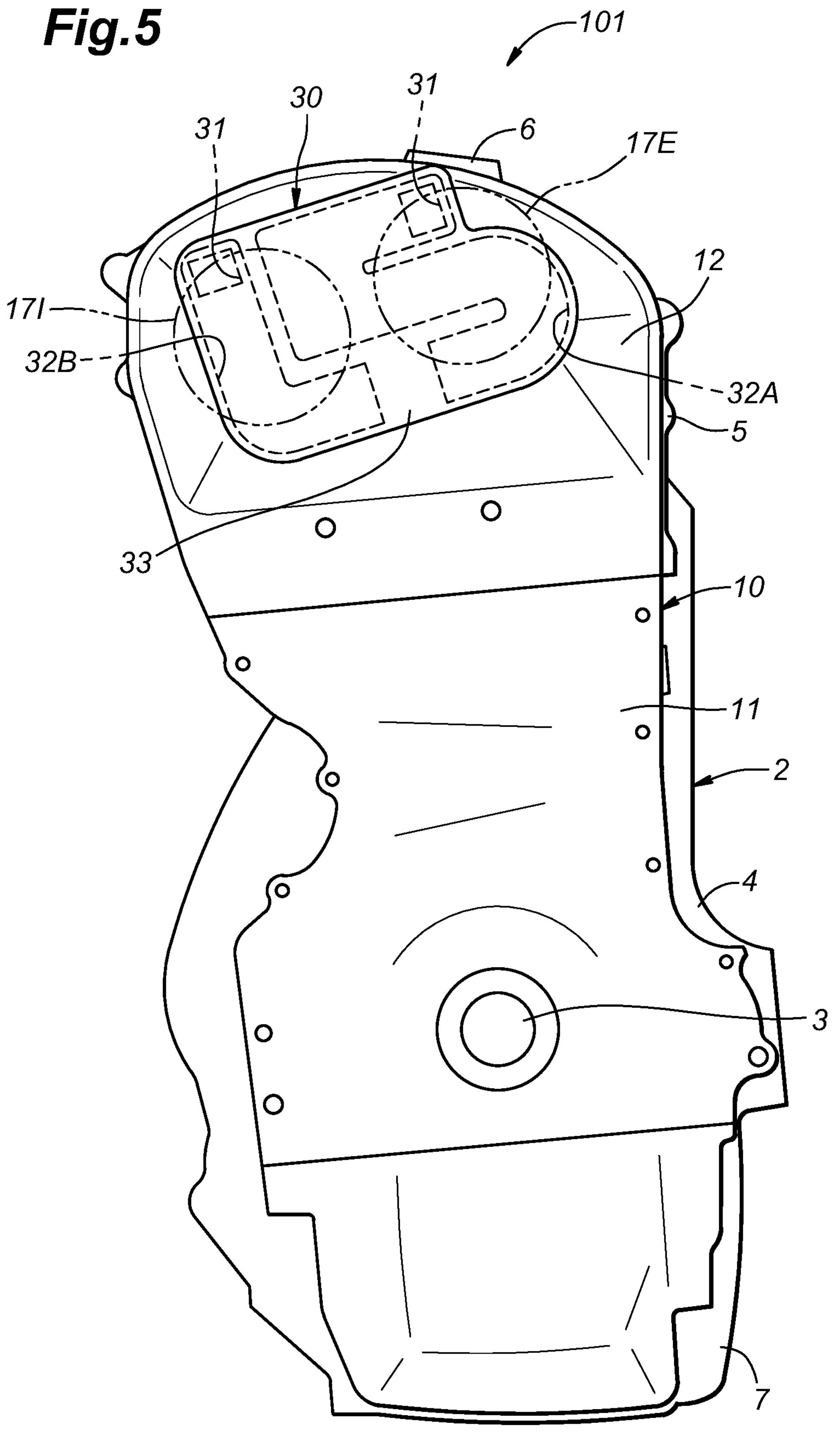
FIG. 5 is a front view of an internal combustion engine according to a second embodiment of the present invention.
Figure 6:
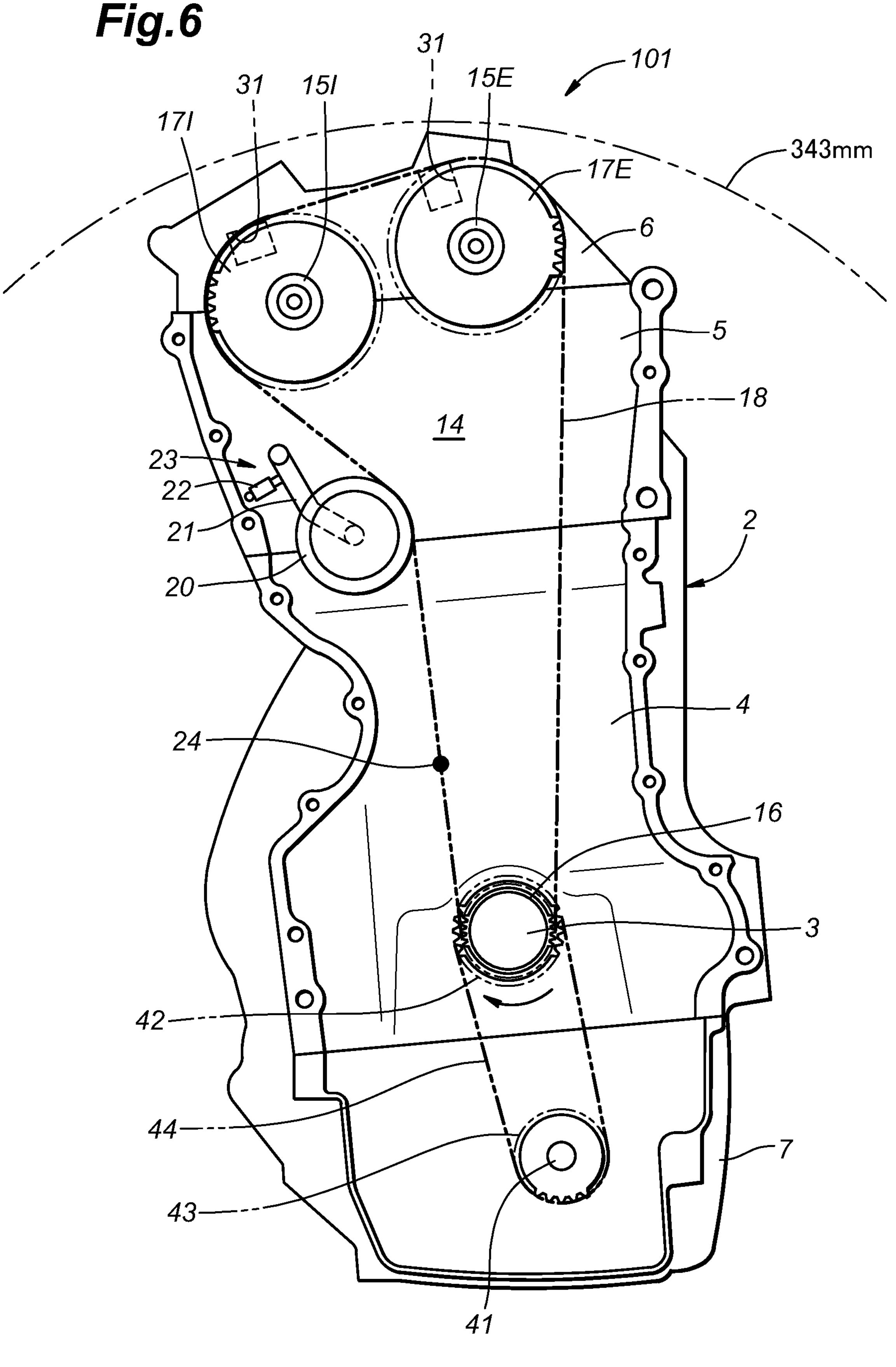
FIG. 6 is a front view of the internal combustion engine with the belt cover thereof removed.

FIG. 5 is a front view of the internal combustion engine 101 of the second embodiment, and FIG. 6 is a front view of the internal combustion engine 101 with the belt cover 10 removed. The engine main body 2 of this embodiment includes an engine block 4 defining a plurality of cylinders arranged in a single row, and a cylinder head 5 fastened to the upper end of the engine block 4. An intake camshaft 15I and an exhaust camshaft 15E are rotatably supported by the cylinder head 5. The internal combustion engine 101 is a DOHC engine in which two camshafts 15 are positioned in the cylinder head 5. The intake camshaft 15I is positioned on the left side in the drawing, and the exhaust camshaft 15E is positioned on the right side in the drawing. A pair of cam pulleys 17I and 17E are attached to the front end of the intake camshaft 15I and the front end of the exhaust camshaft 15E, respectively.

A balancer device (not shown) is provided inside the oil pan 7. A balancer drive shaft 41 having an axis in parallel with the crankshaft 3 is placed in the oil pan 7 to drive balancer shafts of the balancer device (not shown in the drawings). The front end of the balancer drive shaft 41 protrudes from the front end of the oil pan 7, and is fitted with a balancer drive pulley 43.

In addition to the crank pulley 16, the crankshaft 3 is fitted with an auxiliary crank pulley 42 for driving the balancer drive pulley 43 of the balancer device via a balancer drive belt 44. The balancer drive belt 44 consists of a cogged belt, and the auxiliary crank pulley 42 and the balancer drive pulley 43 consist of cogged pulleys with external teeth formed on the outer periphery. As the crankshaft 3 rotates during operation of the internal combustion engine 101, the balancer drive shaft 41 rotates in the same direction as the crankshaft 3 at twice the rotational speed and rotationally drives the balancer shafts of the balancer device.

An endless timing belt 18 is wound around the crank pulley 16 and the two cam pulleys 17. The timing belt 18 is a cogged belt with teeth formed inside, and each pulley consists of a cogged pulley with external teeth formed on the outer periphery thereof. During operation of the internal combustion engine 101, the crankshaft 3 and the crank pulley 16 rotate clockwise as indicated by the arrow in FIG. 6, and the cam pulleys 17 rotate in the same direction as the crank pulley 16 at a half the speed of the crank pulley 16.

A tension adjusting device 23 including a tensioner pulley 20 is positioned on a slack side (left side) of the timing belt 18. A tensioner pulley 20 of the tension adjusting device 23 is pushed against the outer side of the timing belt 18 under the biasing force of a spring 22. During operation of the internal combustion engine 101, the clockwise rotation of the crank pulley 16 causes the timing belt 18 to travel in the clockwise direction, causing the balancer drive pulley 43 of the balancer device at twice the speed of the crank pulley 16. The tensioner pulley 20 rotates in the opposite direction to that of the crankshaft 3.

The part of the timing belt 18 between the crank pulley 16 and the tensioner pulley 20 is given with a significant slack, and is therefore likely to vibrate to a significant extent during the operation of the internal combustion engine 101. This part of the timing belt 18 (midpoint of the span of the timing belt 18 between the tensioner pulley 20 and the crank pulley 16 which is indicated by the black dot in FIG. 6) becomes a vibration source 24 for the vibration of the air within the belt chamber 14.

In this internal combustion engine 101, owing to the presence of the belt cover 10, the noise (resonance sound from the belt cover 10) in the frequency band of 270 Hz is predominant. More specifically, 270 Hz is the primary vibration frequency of the belt cover 10. The second antinode of this 270 Hz vibration is located 343 mm away from the vibration source 24.

In this embodiment also, a pair of sound reducing chambers 32 (a first sound reducing chamber 32A and a second sound reducing chamber 32B) are defined by a chamber forming member 33 in cooperation with the upper belt cover 12. The first sound reducing chamber 32A and the second sound reducing chamber 32B are configured similarly to those of the first embodiment. The opening 31 of the first sound reducing chamber 32A is positioned at a distance of 311 mm from the vibration source 24 in the belt chamber 14, opposite to a part of the timing belt 18 wound around an upper end part of the cam pulley 17E of the exhaust camshaft 15E. The column length of the first sound reducing chamber 32A is 344 mm or a quarter of the wavelength of the noise (primary vibration) that is desired to be reduced. The primary vibration noise generated from the belt cover 10 is thus reduced by positioning the opening 31 of the first sound reducing chamber 32A so as to face the portion of the timing belt 18 wound around the cam pulley 17E.

Further, the opening 31 of the second sound reducing chamber 32B is positioned opposite to a part of the timing belt 18 wound around an upper end part of the cam pulley 17I of the intake camshaft 15I. The column length of the second sound reducing chamber 32B is a quarter of the wavelength of the noise (secondary vibration) that is desired to be reduced. The secondary vibration noise generated from the belt cover 10 is thus reduced by positioning the opening 31 of the second sound reducing chamber 32B so as to face the portion of the timing belt 18 wound around the cam pulley 17I.

Since the sound reducing chamber 32 is formed by the belt cover 10 and the chamber forming member 33, an increase in the weight of the belt cover 10 including the sound reducing device 30 is minimized. This embodiment provides similar advantages as those of the first embodiment.

The present invention has been described in terms of specific embodiments, but can be modified in various ways without departing from the scope of the present invention. For instance, the chamber forming member 33 may form a single sound reducing chamber 32, or three or more sound reducing chambers 32, instead of two. In the above embodiments, the first sound reducing chamber 32A had an S shape and the second sound reducing chamber 32B had an L shape, but may also have linear, wavy or spiral shapes. The foregoing disclosure was directed to internal combustion engines having cylinders that are substantially vertically oriented. But the present invention is substantially equally appliable to internal combustion engines having substantially horizontally oriented cylinders. In addition, the specific configurations, arrangements, quantities, materials, etc. of various parts can be changed as appropriate within the scope of the present invention. Moreover, the above embodiments may be combined with each other in part or all of the configurations. Further, not all of the components shown in the above embodiments are essential, and can be selected and substituted as appropriate.

The invention claimed is:

1. A sound reducing device for an internal combustion engine that includes a crankshaft rotatably supported by an engine main body, a camshaft rotatably supported by the engine main body, a timing belt passed around a crank pulley fitted to the crankshaft and a cam pulley fitted to the camshaft, and a belt cover attached to the engine main body to define a belt chamber for accommodating the timing belt therein jointly with the engine main body, the sound reducing device comprising a chamber forming member defining a sound reducing chamber having a prescribed column length jointly with the belt cover, wherein the sound reducing chamber communicates with the belt chamber via an opening, the opening opposes a part of the timing belt passed around the cam pulley, and the sound reducing chamber extends from the opening while being curved in shape so as to overlap with the cam pulley as viewed in an axial direction with respect to the camshaft.

2. The sound reducing device according to claim 1, wherein the camshaft is one of a pair of camshafts for intake and exhaust, respectively, each camshaft is fitted with a corresponding cam pulley, and the internal combustion engine further includes a tension adjusting device for adjusting a tension of a slack side of the timing belt, and wherein the opening is located opposite to a part of the timing belt wrapped around the cam pulley which is located on a tight side of the timing belt.

3. The sound reducing device according to claim 1, wherein the sound reducing chamber is one of a pair of sound reducing chambers having respective openings and different column lengths corresponding to different frequency bands.

4. The sound reducing device according to claim 3, wherein the sound reducing chambers are formed so as not to overlap with each other as viewed in the axial direction with respect to the camshaft.

5. The sound reducing device according to claim 3, wherein the camshaft is one of a pair of camshafts for intake and exhaust, respectively, each camshaft is fitted with a corresponding cam pulley, the opening of one of the sound reducing chambers is located opposite to a part of the timing belt passed around one of the cam pulleys, and the opening of another of the sound reducing chambers is located opposite to a part of the timing belt passed around another of the cam pulleys.

6. The sound reducing device according to claim 1, wherein the internal combustion engine consists of a V-type engine having a pair of cylinder heads, and the chamber forming member is provided on the cylinder head on a tight side of the timing belt and not on the cylinder head on a slack side of the timing belt.

7. The sound reducing device according to claim 1, wherein the belt cover and the chamber forming member are made of resin material, and are formed as an integral molded member.

8. A sound reducing device for an internal combustion engine that includes a crankshaft rotatably supported by an engine main body, a camshaft rotatably supported by the engine main body, a timing belt passed around a crank pulley fitted to the crankshaft and a cam pulley fitted to the camshaft, and a belt cover attached to the engine main body to define a belt chamber for accommodating the timing belt therein jointly with the engine main body, the sound reducing device comprising a chamber forming member defining a sound reducing chamber having a prescribed column length jointly with the belt cover, wherein the sound reducing chamber communicates with the belt chamber via an opening, the opening opposes a part of the timing belt passed around the cam pulley, the sound reducing chamber is one of a pair of sound reducing chambers having respective openings and different column lengths corresponding to different frequency bands, the camshaft is one of a pair of camshafts for intake and exhaust, respectively, each camshaft is fitted with a corresponding cam pulley, one of the sound reducing chambers extends from the opening thereof while being curved in shape so as to overlap with one of the cam pulleys as viewed in an axial direction with respect to the camshafts, and another of the sound reducing chambers extends from the opening thereof while being curved in shape so as to overlap with another of the cam pulleys as viewed in the axial direction with respect to the camshafts.

9. The sound reducing device according to claim 8, wherein the internal combustion engine consists of a V-type engine having a pair of cylinder heads, and the chamber forming member is provided on the cylinder head on a tight side of the timing belt and not on the cylinder head on a slack side of the timing belt.

10. The sound reducing device according to claim 8, wherein the belt cover and the chamber forming member are made of resin material, and are formed as an integral molded member.

* * * * *